United States Patent [19]
Haskell

[11] 4,320,514
[45] Mar. 16, 1982

[54] SPREAD SPECTRUM FH-MFSK RADIO RECEIVER

[75] Inventor: Barin G. Haskell, Tinton Falls, N.J.

[73] Assignee: Bell Telephone Laboratories, Incorporated, Murray Hill, N.J.

[21] Appl. No.: 157,266

[22] Filed: Jun. 9, 1980

[51] Int. Cl.³ .............................................. H04B 7/12
[52] U.S. Cl. ......................................... 375/1; 375/34; 375/58; 455/29
[58] Field of Search ........................... 375/1, 34, 58, 2; 455/29

[56] References Cited

U.S. PATENT DOCUMENTS

| | | | |
|---|---|---|---|
| 3,506,966 | 4/1970 | Magnuski | 455/29 |
| 3,550,003 | 12/1970 | Halsted | 375/58 |
| 3,916,313 | 10/1975 | Lowry | 375/1 |
| 3,934,203 | 1/1976 | Schiff | 375/1 |
| 4,037,159 | 7/1977 | Martin | 375/58 |
| 4,066,964 | 1/1978 | Costanza et al. | 375/1 |
| 4,193,030 | 3/1980 | Rabow et al. | 375/1 |

OTHER PUBLICATIONS

"A Spread Spectrum Technique for High Capacity Mobile Communication", Conf. Rec. 27th IEEE Veh. Tech. Conf., pp. 98-103.
"A Receiver Feasibility Study . . . Mobile Radio System", Conf. Rec. 28th IEEE Vehicular Tech. Conf., pp. 98-104.
"A Processing Satellite Transponder . . . Mobile Users", 4th Int. Conf. on Dig. Sat. Comm., pp. 166-174.
"A Satellite-Borne . . . FSK Communication Signals", 1979 Ultrasonic Symposium Proceedings, paper E-1.
"Frequency Hopped Multilevel FSK for Mobile Radio", IEEE 1980 Int. Zurich Seminar on Dig. Comm., pp. A5.1-A5.6.

*Primary Examiner*—Glen R. Swann, III
*Attorney, Agent, or Firm*—Erwin W. Pfeifle

[57] ABSTRACT

The present invention relates to a spread spectrum, FH-MFSK radio receiver capable of demodulating and decoding one or more concurrently received L-length frequency-hopping, Q level frequency shift keyed signals to determine the correct signal of a particular user. In operation, the receiver spectrum analyzes the received signal to determine which frequency components are present during each of the L chip intervals and then demodulates a particular user's L-length FH address signal with the derived frequency components to arrive at a Q by L-length detection matrix. A detector and checking processor determines which L-length matrix rows have a maximum number of entries and if only one such row exists, that level is deemed the correct message level. Where multiple maximum-length rows are found the processor uses the address sequences of all other users to check if the row entries could have been caused by interference. The row with the minimum matches is deemed the correct message level.

5 Claims, 6 Drawing Figures

SPREAD SPECTRUM FH-MFSK RADIO RECEIVER

BACKGROUND OF THE INVENTION

1. Field of the Invention

The present invention relates to a spread spectrum frequency-hopping multilevel frequency shift keying (FH-MFSK) receiver and, more particularly, to a spread spectrum L-length frequency-hopping sequence, Q-level frequency shift keying receiver which is capable of decoding an L-length received signal using a particular user's FH address sequence and using a unique checking technique for more accurately choosing the correct one of one or more of the possible received Q levels.

2. Description of the Prior Art

Spread spectrum radio communication systems using various modulation techniques have evolved to provide protection of transmitted radio signals from detection, demodulation and/or interference by outside sources. In multiple access spread spectrum communication, each user has access to the whole system bandwidth. One way of distinguishing the signals from different users is to give each user an address consisting of a fixed pattern in time and frequency. The information to be transmitted is modulated or coded onto the address. The receiver detects the appropriate address and decodes the message. This technique is often referred to as random-access-discrete-address (RADA) or code-division multiple access (CDMA).

The two major impairments of mobile radio communication systems are interference from other users and multipath fading. The conventional Frequency Division Multiple Access (FDMA) technique uses guard bands between frequency channels to minimize interference and increased signal power to combat fading. Recently, various frequency-hopping (FH) techniques havr been proposed for use in mobile and satellite radio systems.

One such technique is disclosed in the article "A Spread Spectrum Technique for High Capacity Mobile Communications" by G. R. Cooper et al. in the Conference Record of the *Twenty-Seventh Annual IEEE Vehicular Technology Conference* at Orlando, Fl. on Mar. 16–18, 1977 at pages 98–103 which relates to a cellular spread spectrum frequency-hopped, differential phase shift keying (FH-DPSK) mobile communication system. In a typical receiver an array of delay lines and bandpass filters selects the desired address waveform out of the incoming signal. The phases of the various elements of the desired signal are detected relative to the previous word and are then passed through a linear combiner and maximum-likelihood decision circuit for proper processing.

Another technique for use with a satellite communication system is disclosed in the article "A Processing Satellite Transponder for Multiple Access by Low-Rate Mobile Users" by A. J. Viterbi in the Conference Record of the *Fourth International Conference on Digital Satellite Communications* at Montreal, Canada on Oct. 23–25, 1978 at pages 166–174 which relates to a frequency-hopping, multilevel frequency shift-keyed (FH-MFSK) arrangement. In the disclosed receiving section, a set of received $Q=2^K$ level, L-length signals are spectrally decoded and processed to produce an L-length transmission in the decoded signal. Usually only one such signal is produced. If two or more L-length signals are provided, resolution would be to arbitrarily select one as the correct message.

The use of FH-MFSK techniques with mobile radio communication systems, however, provides problems of, for example, multipath fading and noise which are not necessarily as prevalent in satellite communication systems. Typically, multipath propagation and noise would lead to imperfect tone detection of the various concurrent frequency-hopped signals at the receiver, causing additional errors. In some instances, multiple full L-length levels may be found in decoding a received signal of many concurrent users. At other instances the degrading of certain signals by multipath propagation and noise may result in no full L-length signal sequence being found at the receiver, in which case the longest of the signal sequences would be selected.

The problem remaining in the prior art is to provide a FH-MFSK received which can decode multiple concurrently received FH-MFSK signals and provide an output signal indicative of the correct signal under conditions where the decoding results in one or more sequences which share a maximum length equal to or less than L or some other predetermined maximum obtainable value.

SUMMARY OF THE INVENTION

The foregoing problem has been solved in accordance with the present invention which relates to a spread spectrum frequency-hopping (FH), multilevel frequency shift keying (MFSK) receiver and, more particularly, to a spread spectrum L-length FH address sequence, Q level FSK receiver which is capable of decoding an L-length frequency-hopping received signal using a particular user's FH address sequence and using a unique checking technique for more accurately choosing the correct one of the Q levels having a maximum length equal to or less than L or some other maximum value and for conversion to that user's indicated received signal.

It is an aspect of the present invention to provide a FH-MFSK receiver including a checking processor capable of providing an indication of the MFSK level having more likelihood of being the user's correct transmitted signal under conditions where errors are introduced by, for example, multipath signal fading and/or noise. In operation, the checking processor determines which L-length levels comprise a maximum number of derived frequency components, and if only one such level is found this level is determined as the particular user's correct message. Where multiple equal maximum length levels are found, the checking processor uses the detection matrix and the address sequence of all other users to determine if the frequency components forming each of the multiple levels may have been caused by another user's transmissions. The level having the least number of other user's contributions is determined as the particular user's correct message.

Other and further aspects of the present invention wil become apparent during the course of the following description and by reference to the accompanying drawings.

BRIEF DESCRIPTION OF THE DRAWING

Referring now to the drawings, in which like numerals represent like parts in the several views.

DETAILED DESCRIPTION

The present invention is described hereinafter primarily with the use of $2^K$ frequencies or elements. However, it will be understood that such description is exemplary only and is for the purposes of exposition and not for purposes of limitation. It will be readily appreciated that the inventive concept described is equally applicable for use in systems with Q frequencies, where, for example, $Q=p^n$ where p is a prime and n is an integer.

Figure 1:
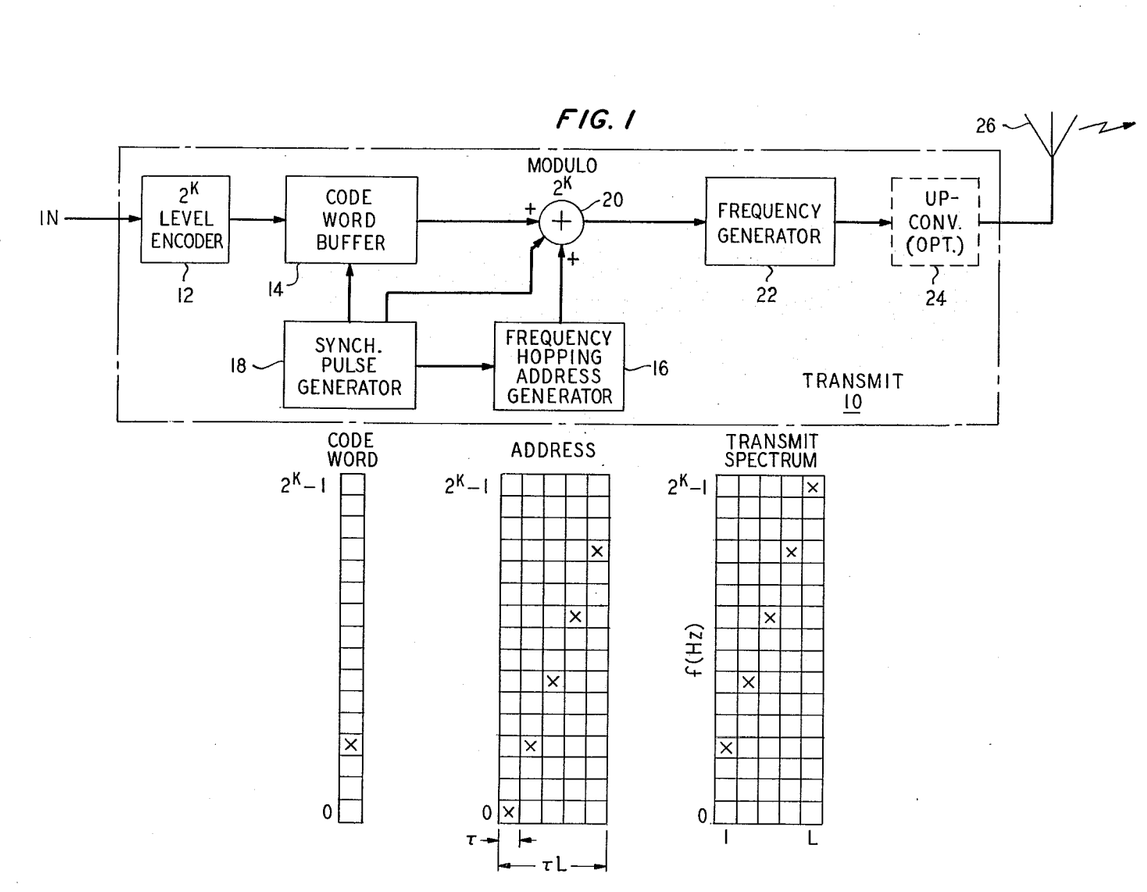
FIG. 1 is a block diagram of a FH-MFSK transmitter in accordance with the present invention.

A block diagram of a typical spread spectrum frequency-hopping, multilevel frequency shift keying (FH-MFSK) transmitter for use, for example, in a mobile radio communication system in accordance with the present invention is shown in FIG. 1. The transmitter 10 comprises a $2^K$ level encoder 12 which functions, for example, to periodically sample an analog input signal from a particular system user and convert the amplitude level of each sample into an equivalent K-bit code word. If, on the other hand, the input signal from the particular system user is already in binary form, encoder 12 can operate, for example, to use each group of K sequential bits as the individual $2^K$ bit code word. In either case, the resultant K-bit code word is stored temporarily in a code word buffer 14 and made available at its output. An exemplary code word is shown in FIG. 1 below code word buffer 14 and designated "Code Word" where the code word comprises an indication in the $4^{th}$ level (level 3) of a possible 16 levels (0-15), where K=4.

A frequency-hopping address generator 16 functions to generate a unique frequency-hopping address sequence which is different for each system user within the same zone or cell. The address is a sequence of L chips with each chip having a duration of $\tau$ seconds and comprising one level or one K-bit word of a possible $2^K$ levels. Chip words or levels can be different for each chip of the address. For example, as shown in the matrix designated "Address" below generator 16 in FIG. 1, an address sequence for a particular system user may comprise five chips, where L=5, where chips 1-5 are designated levels 0, 3, 6, 9 and 12, respectively, having a +3 slope within the $2^K$ possible code levels for each chip, where K=4.

A synchronizing pulse generator 18 functions to generate pulses from an internal clock for causing the code word indication to be stored in buffer 14 and, following this, each chip level of the address to be sequentially transmitted from generator 16 to a modulo-$2^K$ adder 20. Adder 20 functions to modulo-$2^K$ add the K-bit code word and, sequentially, the address chip words to generate a new L-length sequence of code words or levels as shown in, for example, the matrix designated "Transmit Spectrum" in FIG. 1. This resultant new code word sequence is used by a frequency generator 22 to generate a particular one of $2^K$ frequencies, within the system's overall bandwidth, for each chip of $\tau$ second duration of the new code word sequence as designated by the corresponding level of each chip of the Transmit Spectrum. For example, for the "Transmit Spectrum" matrix of FIG. 1, frequency generator 22 will transmit frequencies corresponding to the $3^{rd}$, $6^{th}$, $9^{th}$, $12^{th}$ and $15^{th}$ levels of the possible matrix levels 0-15 during the $\tau$ second durations of chips 1-5, respectively, where K=4. This sequence of L tones or frequencies can be upconverted by optional upconverter 24 into the proper system transmit frequency spectrum if not already done so by generator 22 for transmission by antenna 26.

It is to be understood that elements 12, 14, 16, 18, 20, 22 and 24 of transmitter 10 can comprise any suitable circuit which will perform the functions indicated hereinbefore. For example, buffer 14 and address generator 16 can comprise memory devices which temporarily store the code word or permanently store the address chip words, respectively, for accessing at the appropriate time.

In summary, at transmitter 10, K source bits are accumulated in a buffer 14 and held for $L\tau$ seconds while they are added modulo-$2^K$ as a K-bit word to each of the elements of the address from generator 16. The sums determine the sequence of transmitted frequencies. In this way, K bits are transmitted during the $L\tau$ seconds. Therefore, the elementary signals are a set of $2^K$ tones, each of duration $\tau$ seconds. Each link or user pair in the system is identified by an address which is a sequence of L K-bit words, one K-bit word for each chip. A new code word, conveying K bits, is transmitted every $L\tau$ seconds as a sequence of L tones. Each tone is determined by the sum (modulo-$2^K$) of a K-bit word from the source and one of the K-bit address words.

Figure 2:
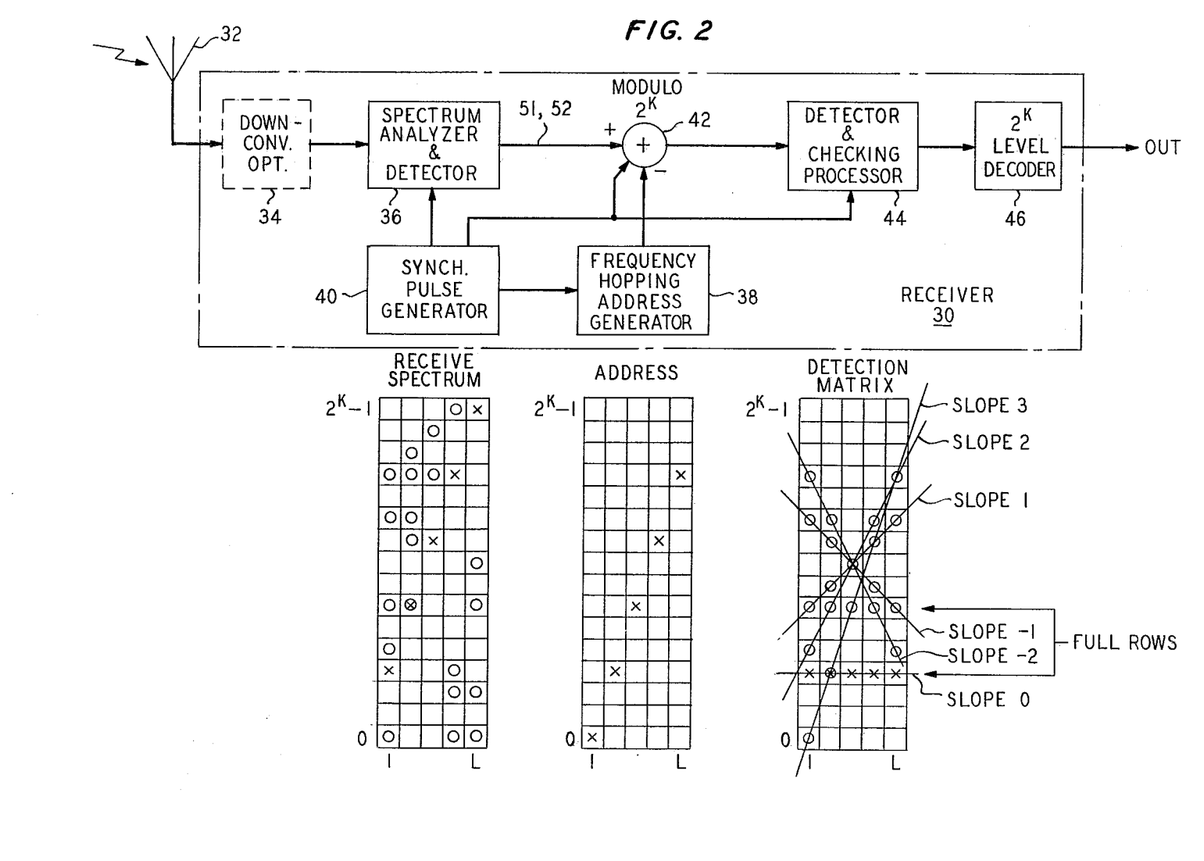
FIG. 2 is a block diagram of a FH-MFSK receiver capable of receiving multiple FH-MFSK signals and choosing a desired user's signal therefrom in accordance with the present invention.

FIG. 2 illustrates a receiver 30 in accordance with the present invention capable of receiving and decoding a FH-MFSK signal transmitted by one or more transmitters of the type shown in FIG. 1. The FH-MFSK signal is received at an antenna 32 and downconverted, if necessary, by an optional downconverter 34 to a proper frequency band prior to further processing. The received or downconverted signal is processed by a spectrum analyzer and detector circuit 36 to determine which of the $2^K$ frequencies or tones are present during each chip interval. The received signal, however, is generally a composite of the time-synchronous tone sequences of a plurality of transmitters. Spectrum analyzer and detector circuit 36 can comprise, for example, $2^K$ tone detectors for determining which of the $2^K$ tones are present. Each tone detector then would decide, every $\tau$ seconds, whether the received signal contains energy at a separate distinct one of the $2^K$ frequencies to which it is tuned. Alternatively, spectrum analyzer and detector 36 can comprise a spectral estimating transponder as shown in FIG. 2 of the hereinbefore-mentioned article by A. J. Viterbi. In any case it will be understood that spectrum analyzer and detector 36 can comprise any suitable arrangement for detecting the various frequencies present during each chip interval and for generating an appropriate output signal indicating which frequencies are present or not. The matrix of received energy designated "Receive Spectrum" in FIG. 2 shows the transmitted tones of FIG. 1 as shown by the "Xs" and the tones, indicated by circles, received from five other links.

During each chip interval, the detected levels from spectrum analyzer and detector 36 are transmitted to a modulo-$2^K$ subtractor 42 where the address level corresponding to that chip is modulo-$2^K$ subtracted therefrom to generate a "Detection Matrix" shown in FIG. 2. The Detection matrix shows the resultant elements from the user of FIG. 1, as indicated by the "Xs," and also the elements of the five other links, as indicated by the circles, which resulted from the modulo-$2^K$ subtraction of the same address elements from the received tones or frequency components from those other links. The lines passing through elements in the L chips indicate which of the six users generated each of the frequency components shown, each line also indicating the difference in slope between the address of the desired user and the address of each of the other interfering users.

Figure 3:
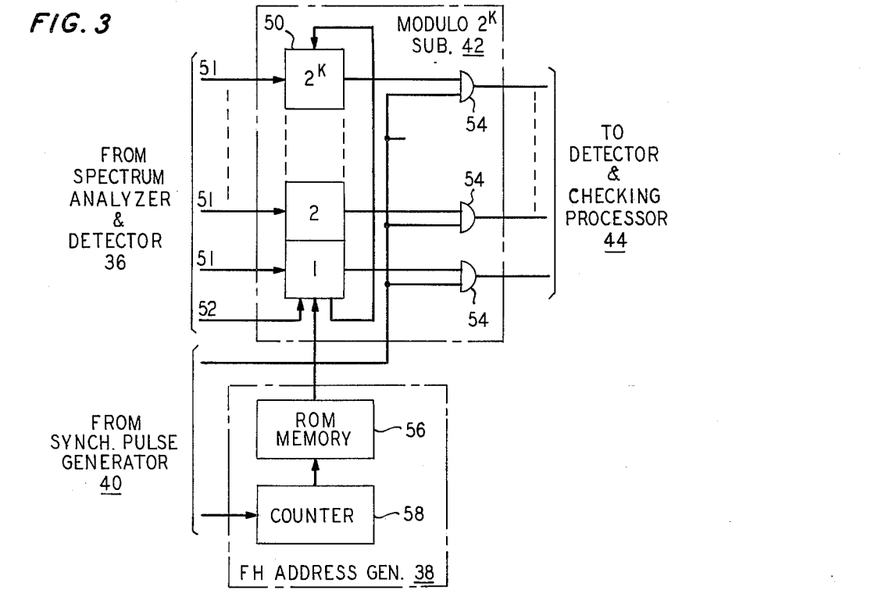
FIG. 3 is a block diagram of an exemplary modulo-$2^K$ subtractor and a frequency-hopping address generator for use in the receiver of FIG. 2.

FIG. 3 is a block diagram of an exemplary modulo-$2^K$ subtractor 42 and a frequency-hopping address generator 38 for use in the receiver of FIG. 2. Such circuitry can similarly be applied to the modulo-$2^K$ adder 20 and the FH address generator 16 in the transmitter of FIG. 1. It is to be understood that the arrangements shown in FIG. 3 are not for purposes of limitation since any other suitable device may be used as, for example, a $2^K$ by $2^K$ switching matrix for the modulo-$2^K$ subtractor 42 which is under the control of the FH address generator 38. The modulo-$2^K$ subtractor 42 shown in FIG. 3 comprises a shift register 50 including $2^K$ stages which can be, for example, concurrently input on leads 51 or serially inputted on lead 52 from spectrum analyzer and detector circuit 36, and a plurality of $2^K$ gates 54 which are responsive to an enable pulse from synchronizing pulse generator 40 to gate the contents of shift register 50 to detector and checking processor 44.

The FH address generator 38 shown in FIG. 3 comprises a ROM memory 56 which stores one or more of the various FH address words of desired system users and a counter 58 which is responsive to an enable pulse from the synchronizing pulse generator 40 at the start of a message transmission, the first chip interval, and for each successive chip interval for causing the memory to transmit the appropriate count to be subtracted modulo-$2^K$ during each chip interval for a particular user in accordance with his address. For example, for the address shown in the FIG. 2 address matrix, the address generator 38 of FIG. 3 would transmit a 0, $-3$, $-6$, $-9$ and $-12$ for each of the 1-5 chip intervals, respectively, to modulo-$2^K$ subtractor 42.

In operation, the signals from spectrum analyzer and detector circuit 36 are appropriately entered into the $2^K$ stages of register 50 during each chip interval, and the associated chip interval signal from FH address generator 38 causes register 50 to appropriately cyclically shift modulo-$2^K$ the contents by the amount indicatd by generator 38. Once the shifting has been completed, an enable signal from synchronizing pulse generator 40 causes a plurality of $2^K$ gates 54 to concurrently transmit the contents of the $2^K$ stages of register 50 to detector and checking processor 44. For example, using the address in the matrix of FIG. 2, during the first chip interval the contents of register 50 would be shifted downwards modulo-$2^K$ zero stages before transmission to detector and checking processor 44. Similarly, the contents stored in register 50 during chip intervals 2-5 would be shifted downwards modulo-$2^K$ a total of 3, 6, 9 and 12 stages, respectively, before being gated out to circuit 44. The output of modulo-$2^K$ subtractor 42 in FIG. 2 over the L chip intervals results in a Detection matrix shown in FIG. 2 for a particular user having the address shown.

In the absence of transmission impairments, the transmitted code word always results in a complete row of entries in the Detection matrix corresponding to the transmitted level or code word. Errors can occur when the tones from other links combine to form other complete rows in the Detection matrix. It becomes evident that as the number of users increases, the greater becomes the possibility that multiple complete rows might exist. Additionally, thermal noise in the receiver can also influence the Detection matrix since such noise can cause a tone to be detected when no such tone was originally transmitted, also known as a false alarm, or cause a transmitted tone to be omitted which is also known as a deletion. Therefore, as the number of system users increases, the possibility of multiple complete rows also increases and, compounded with the possibility of false alarms and deletions, makes the choice of the correct one of the $2^K$ levels in the Detection matrix difficult at times.

The output from modulo-$2^K$ subtractor 42 is transmitted to a detector and checking processor 44 where it is further processed. Detector and checking processor 44 interrogates the Detection matrix to determine which of the $2^K$ levels have a full row or, alternatively, a maximum length if no full rows exist. Where only one level is full or has such maximum length, that level indication is transmitted to a $2^K$ level decoder 46 which converts the indicated level to either a K-bit binary message or an analog signal sample having an amplitude corresponding to the indicated level depending upon the type of reception necessary by the ultimate user. From the Detection matrix of FIG. 2, it can be seen that level 3 is a full row of entries, as generated by the desired user, and also level 6 is a full row of entries, each element being generated by a separate one of the five other interfering users.

If noise is negligible, erroneous full rows can only be created by other users, and since their addresses are, or can be made, known to the receiver, checking can be carried out in an attempt to distinguish the erroneous full rows from the correct full row in accordance with the present invention. To generally illustrate the present checking procedure let $X_m$ be transmitted level of user m, let $F_{mk}$ be the address level of user m in chip k, and suppose row r is a full row in the $Q \times L$ Detection matrix of user m, and the validity of chip k is to be checked. This is done as follows for m users when all users are synchronized as in base-to-mobile transmission in a mobile radio communication system.

Slot (r,k) of the Detection matrix has an entry. If user $m' \neq m$ caused this, then $$(X_{m'} + F_{m'k} - F_{mk}) \mod\text{-}Q = r,$$

or $$X_{m'} = (r + F_{mk} - F_{m'k}) \mod\text{-}Q \tag{1}$$

This is certainly possible; thus, nothing is learned yet. However, this value of $X_m$, implies the chip i should have an entry at level $$f = (X_{m'} + F_{m'i} - F_{mi}) \bmod Q. \quad (2)$$

If it does not, then user $m'$ could not have caused the entry (r,k). The test is carried out for all chips i, and as soon as one is found which does not have the appropriate entry, it is concluded that user $m'$ could not have caused entry (r,k). The procedure is carried out for each of the other users $m' \neq m$, and if all of them fail the test, then only user m could have caused entry (r,k). Detector and Checking Processor 44 then declares $X_m = r$, and the procedure is finished. Otherwise, for each user $m' \neq m$ which passes the test, Processor 44 declares a match for entry (r,k) and moves on to the next chip.

If all chips in full row r have at least one match, then it is not possible to tell with certainty whether or not the row is correct. In this case, Processor 44 moves on to the next full row and repeats the procedure. As soon as a row is found which contains a chip with zero matches, that row is declared to be the correct one, and the checking procedure terminates. If all chips of all full rows have one or more matches, then the row with the fewest matches is chosen as most likely to be the correct one.

Figure 4:
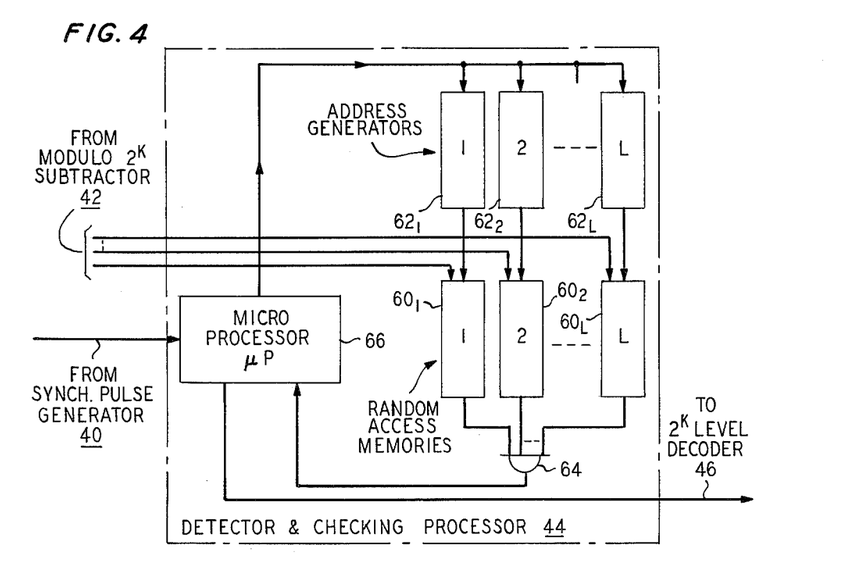
FIG. 4 is a block diagram of an exemplary implementation of the Detector and Checking Processor of FIG. 2 for checking a Q×L detection matrix under a synchronized base-to-mobile transmission arrangement.

A preferred arrangement for Detector and Checking Processor 44 of FIG. 2 is shown in FIG. 4 for checking a $2^K \times L$ detection matrix which is applicable for the reception of transmission where all users are synchronized as in the case of base-to-mobile transmission in a mobile radio communication system. It is to be understood that any other suitable arrangement can be used for practicing the technique of checking in accordance with the present invention. Detector and Checking Processor 44 is shown as comprising L random access memories (RAMs) $60_1$–$60_L$ each having a capacity of $2^K$ bits; L address generators $62_1$–$62_L$ coupled to the L RAMs $60_1$–$60_L$, respectively, with each generator being capable of addressing one of the $2^K$ RAM locations in response to a control signal; an AND gate 64 including L input ports with each port connected to an output of a separate one of the L RAMs; and a microprocessor 66 capable of generating the appropriate control signals to the L address generators $62_1$–$62_L$ and processing the output information from the AND gate 64 and delivering the level of the determined correct message for a particular user to $2^K$ level decoder 46.

Each RAM stores one column of the Detection matrix and designates an entry (X or O in the matrix) by a binary 1 and no-entry in the matrix by a binary 0. The overall operation of the system is managed by a microprocessor 66. The first step is to fine the full rows. This is easily done by microprocessor 66 having all of address generators $62_1$–$62_L$ concurrently produce the same output value, and then cycling through the possible RAM addresses $0 \ldots 2^K - 1$. Full rows will produce all 1s at the RAM outputs. Microprocessor 66 keeps track of which rows produce a gate 64 output = 1, which completes the task.

Having found the full rows, the next step is to "check" each chip of each full row for a "match". Suppose chip k of full row r is to be checked. This is done by microprocessor 66 having the address generators $62_i$ produce appropriate RAM addresses for each possible interfering user $m'$ as defined by equations (1) and (2) and as shown by the various sloped lines in the Detection Matrix of FIG. 2; and then cycling through the M−1 possible interferers. If gate 64 output = 1 occurs at any time during this cycling, microprocessor 66 records a match for chip k, row r. After all checking is completed microprocessor 66 chooses the row with the fewest matches as the correct one.

The number of RAM accesses required for decoding depends on L, Q, M and the number of full rows, $N_F$ where Q for the present case equals $2^K$. Q accesses are required to find the full rows, and $N_F L(M-1)$ accesses are required for checking, giving a total number of accesses $$N_a = Q + N_F L(M-1). \quad (3)$$

For example, in a cellular mobule radio system the parameters might be

W = 6.2 MHz bandwidth
Q = 257 frequencies
L = 6 chips
M = 104 users (efficiency 0.54 bits/sec/Hz)
K = 8 bits/block
R = 32000 bits/second
$N_F = 3$ full rows Then, $N_a = 2111$ accesses would have to be performed within K/R = 250 microseconds. This implies a basic access time ≤ 118 nanoseconds, which is well within the available technology.

The functioning of address generators $62_1$–$62_L$ can be described as follows. Let the user for whom decoding is to be done be denoted by m, and let $F_{ml}$, $l = 1 \ldots L$, denote the frequency hopping pattern for user m. Suppose chip k of row r is desired to be checked. This involves cycling through the possible interferers $m' \neq m$ and arranging that each address generator 62 produce the proper output. The first quantity to be calculated is the candidate datum.

$$X_{m'} = (r + F_{mk} - F_{m'k}) \bmod Q. \quad (4)$$

Then, the address generator $62_i$ associated with RAM i ($1 \leq i \leq L$) should produce as its output the address (frequency)

$$f_i = (X_{m'} + F_{m'i} - F_{mi}) \bmod Q. \quad (5)$$

The managing microprocessor 66 could compute $X_{m'}$ and feed it to each address generator 62 which, in turn, could have the values $$F_{m'i} - F_{mi}; \; m' = 1 \ldots M \quad (6)$$

stored in a look-up table. All that remains is for each address generator 62 to perform a single modulo-Q addition which, again, is well within available technology.

For the chirp addresses used herein for purposes of example only, user m has an address of slope m. Therefore, $$F_{ml} = [m(l-1)] \bmod Q \quad (7)$$

and the hardware simplifies considerably. Equations (4) and (5) become $$X_{m'} = [r + m(k-1) - m'(k-1)] \bmod Q \quad (8)$$

$$f_i = [X_{m'} + m'(i-1) - m(i-1)] \bmod Q$$

or $$f_i = [r + (m - m')k - (m - m')i] \bmod Q. \quad (9)$$

In this case, the managing microprocessor 66 need only supply r and k, and the address generators $62_1$–$62_L$ can compute the $f_i$ at very high speed by cycling through the values of $m' \neq m$. Such a circuit is shown in FIG. 5.

Figure 5:
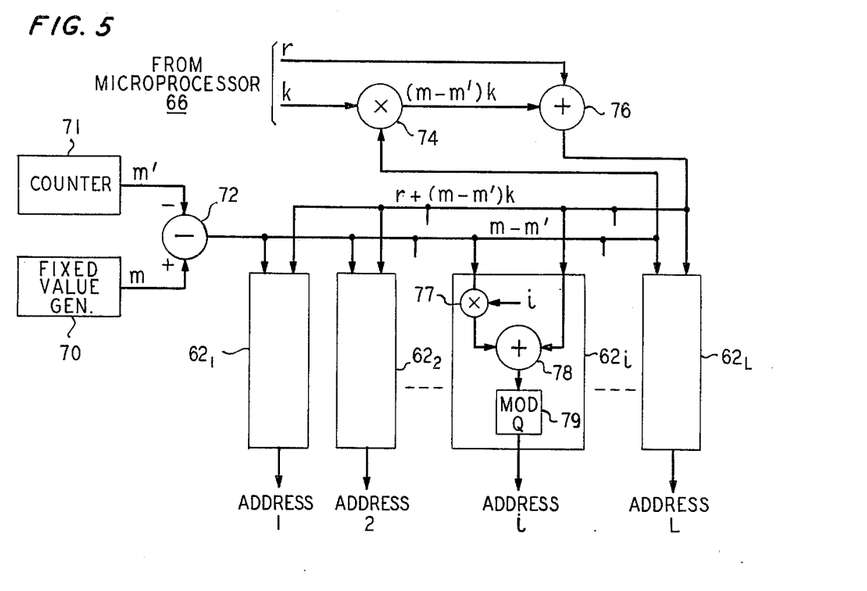
FIG. 5 is a chirp vector implementation of the address generators of FIG. 4.

In FIG. 5 a fixed value generator 70 generates a value for the user m, and a counter 71 generates the value for each interfering user m' in sequence. The value from counter 71 is subtracted from the value generated by generator 70 to form the term (m−m') which is transmitted to one input of each of address generators $62_1$–$62_L$ and to one input of a multiplier circuit 74. Multiplier 74 multiplies the output of subtractor 72 with the value for k supplied by microprocessor 66 to produce the value for (m−m')k which is added by adder 76 with the value r supplied by microprocessor 66 to generate the term r+(m−m')k which is transmitted to a second input to each of address generators $62_1$–$62_L$.

In each of address generators $62_1$–$62_L$, as shown in FIG. 5 for address generator $62_i$, the (m−m') term from subtractor 72 is multiplied by multiplier 77 to produce the term (m−m')i which is added in adder 78 to the output from adder 76 to generate the bracketed term in equation (9). The output of adder 78 is transmitted through a modulo-Q circuit 79 to generate the proper shifting. If Q is $2^K$ as in the present exemplary case, this amounts to simply ignoring all except K-bits of the outputs of adder 78.

Figure 6:
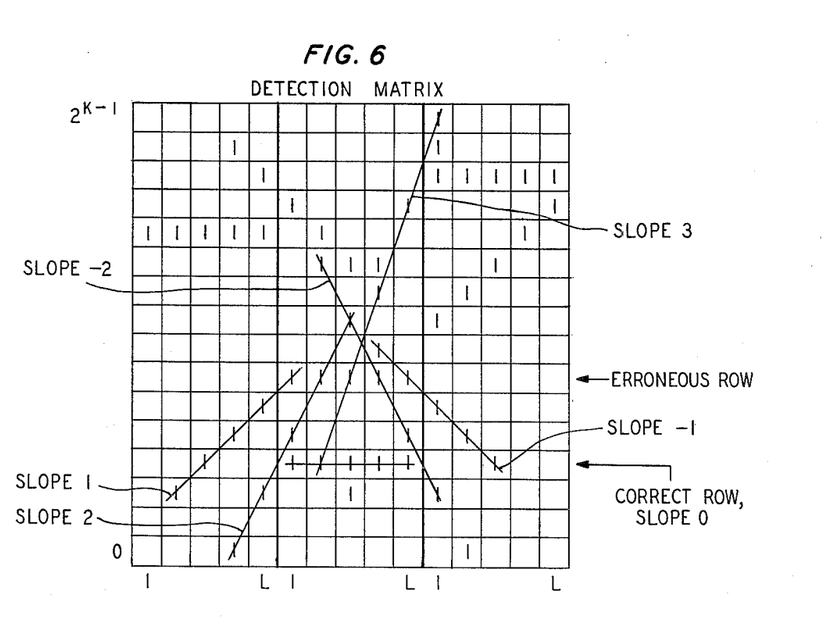
FIG. 6 is a Q×3L detection matrix similar to the detection matrix of FIG. 2 but for use in the non-synchronized arrangement found, for example, in the mobile-to-base transmissions.

In mobile-to-base transmissions in a mobile radio communication system, conditions exist where the users are unsynchronized. To achieve a checking procedure in accordance with the present invention, a Q×3L detection matrix need be stored in processor 44, where Q=$2^K$ in the present example, and it is assumed that the starting and stopping chip for each possible interfering message is known at the base receiver. A typical $2^K$×3L matrix is shown in FIG. 6.

The checking operation at Processor 44 proceeds, essentially, as described hereinbefore for the synchronized case except that, of the 3L RAMs 60, only L will produce an output at any one time depending on which possible interferer is being checked. Each address generator 62 of the 3L address generator must be given, not only the chip k and the row r being checked, but also the starting chip number $1_{m'}$ of each of the M−1 interferers in order to produce an appropriate address or no address at all, whichever the case may be. The Processor 44 then cycles through the M−1 interferers, and if a gate 64 output=1 occurs at any time, the managing microprocessor 66 records a match for chip k, row r, and proceeds as in the synchronous case. The number of RAM accesses required is identical to that of the synchronous case.

For describing the address generator function in the nonsynchronous case, as in the synchronous case, let k and r, respectively, be the chip and row to be checked and m be the user for whom decoding is being done. However, in this case the starting chip number $1_m$, of the message due to interferer m' which could interfere in chip k, row r is also needed. Defining $$l' = k - l_{m'} + 1 \quad (10)$$

as the chip position of k with respect to the start of message of interferer m'. Note that $$1 \leq l' \leq L. \quad (11)$$

Then the candidate data value for interferer m' is $$X_{m'} = (r + F_{mk} - F_{m'l'}) \bmod Q. \quad (12)$$

The address generator 62 associated with RAM i $60_i$, where i satisfies $$l_{m'} \leq i \leq l_{m'} + L - 1, \quad (13)$$

should produce as its output the address (frequency)

$$f_i = (X_{m'} + F_{m'i'} - F_{mi}) \bmod Q \quad (14)$$

where $$i' = i - l_{m'} + 1 \quad (15)$$

is the offset with respect to the start of message of interferer m'. RAMs 60 which do not satisfy equation (13) should produce no output. This procedure, while more complex than the synchronous case, is still implementable using available technology.

As in the synchronous case, the hardware simplifies considerably if chirp vectors are used. Defining l' and i' as above and $F_{ml}$ as in equation (7), then $$X_{m'} = [r + m(k-1) - m'(l'-1)] \bmod Q \quad (16)$$

$$f_i = [X_{m'} + m'(i' - 1) - m(i - 1)] \bmod Q \quad (17)$$
$$= [r + (m - m')k - (m - m')i] \bmod Q$$

which is the same as equation (9) for the synchronous case. In particular, it does not depend on $l_{m'}$. However, each address generator i does have to examine $l_{m'}$ to see if the inequality specified by equation (13) is satisfied i.e., to see whether it should or should not produce an output.

In any real system, fading impairments will cause entries to be deleted or extraneous entries to be added to the Detection matrix. In particular, it may be desirable to check not only full rows, but also rows which are almost full. Also, on occasion where will be no full rows. In checking interferers, it may be desirable to declare a match if a particular interferer "almost" matches.

These operations can conveniently be implemented by replacing the AND gate 64 at the bottom of FIG. 4 by a weighting circuit which produces an output=1 if at least J($\leq$L) of its inputs equal 1. The value J could be set adaptively by the managing microprocessor 66 in order to guarantee that, say, 5 or 6 "almost full" rows were always produced. This value, or one slightly larger, would then also be appropriate for the checking operation.

It should be noted that in the case of noisy transmission, the number of rows to be checked will probably be larger than in the noiseless case. In such a situation short cuts can be taken. For example, instead of checking every chip of every full row, Processor 44 might check only a few chips of every full row. If, after this, some rows have significantly more matches than the others, then they are probably erroneous, and they need not be considered further. After a few more chips, hopefully, other rows can be deleted, until only two or three rows remain which have to be fully checked. This technique of partial checking of rows may be important to avoid having to use excessively high speed RAMs. In all cases, when no unique decision can be made as to the correct row, microprocessor 66 chooses one of the multiple rows at random and transfer the level number to the $2^K$ level decoder 46.

Finally, one additional simplification made possible by the flexibility of RAMs is to be noted. In the present arrangement as described hereinabove and in previous work, it is always assumed that the received data is "dehopped" prior to entry into the detection matrix. It is fairly easily shown that this step is unnecessary for decoding as long as the address generators are modified appropriately. In fact, examination of the relevant equations reveals that, except for the initial search for "full rows," such modification actually leads to simplification.

I claim:

1. A decoding arrangement for use in a spread spectrum radio receiver (30) which receiver is capable of receiving one or more frequency-hopping, multilevel frequency shift keyed (FH-MFSK) signals which were remotely transmitted by modulating a separate one of a plurality of different L-length frequency-hopping address sequences with each user's separate signal sample wherein each address sequence comprises a sequence of L chip periods with each chip period including a code for one of Q possible frequencies, and signal sample is encoded as one of said Q possible frequencies; the decoding arrangement comprising:

spectrum analyzing means (36) capable of generating, in response to a received signal, an output signal indicating the presence on absence of each of the possible Q frequencies in the received FH-MFSK signal during each chip period of the L-length sequence;

frequency-hopping address generating means (38) capable of generating an L-length frequency-hopping address sequence associated with a particular user in synchronism with the received L-length signal; and means (42) capable of demodulating the output signal from the spectrum analyzing means with the address sequence from the frequency-hopping address generating means to generate a set of decoded signals forming a Q level by L-length detection matrix of received demodulated message signals characterized in that the decoding arrangement further comprises:
a processor (44) comprising:
means ($60_I$–$60_L$) capable of storing the set of decoded signals forming a detection matrix of interest, and
means ($62_I$–$62_L$, 64 and 66) capable of determining which of the Q levels of the set of decoded signals in the detection matrix of interest stored in said storing means have a maximum number of frequency presence indications over the L-length decoded sequence and (a) in response to an indication that only one level has a maximum length, generating an output signal indicative of that level as the particular user's correct message, and (b) in response to an indication that multiple levels have an equal maximum length, checking each maximum-length level by using the address sequences of all users other than the particular user to both determine if the frequency indications in each maximum-length level could have been produced by said other users and generate an output signal indicative of the level with the least number of matches by other users as the particular user's correct message.

2. A decoding arrangement according to claim 1 characterized in that
to permit the decoding of multiple unsynchronized L-length transmissions,
the processor storing means is further capable of storing the set of decoded signals forming the detection matrix immediately prior to and immediately after said set of decoded signals forming said detection matrix of interest; and
the processor determining and generating means, in response to an indication that multiple levels in the detection matrix of interest have an equal maximum-length, checks each of the elements of said maximum-length levels by checking the L columns of the three stored matrices corresponding to the L sequence chip periods associated with the received signal from each of said other users using the corresponding address sequence of each of said other users, wherein one of the elements of each of the L columns being checked includes an element from one of the maximum-length levels in the detection matrix of interest.

3. A decoding arrangement according to claim 1 or 2 characterized in that
the processor storage means comprises separate random access storage means (60) for each of the columns of the detection matrices to be stored, each random access storage means being capable of storing Q bits of information forming the Q levels of the associated column of the matrix.

4. A decoding arrangement according to claim 3 characterized in that
the processor determining and generating means comprises:
means ($62_I$–$62_L$) capable of generating an address for accessing and reading out a desired one of the Q bits in each of L random access storage means;
means (64) capable of evaluating the number of frequency indications present in the L bits read out of the random access storage means addressed by said address generating means and generating an output signal representative of such evaluation; and
a microprocessor (66) capable of both generating control signals to said address generating means for accessing the desired random access storage means and determining which of a group of signals from said evaluation means comprise a maximum length and in case of multiple levels comprising an equal maximum length, then accessing the desired random access storage means for determining which of a group of signals from said evaluation means comprises a match indicating that one of said other users could have caused an element in a maximum-length level being checked.

5. A method of decoding one or more concurrently received frequency-hopping, multilevel frequency shift keyed (FH-MFSK) signals which were originally generated by modulating a separate one of a plurality of different L-length frequency-hopping address sequences with each user's separate signal sample wherein each signal sample is encoded as one of said Q possible frequencies, the method comprising the steps of:

(a) spectrum analyzing the received signals for determining which of the possible Q frequencies are present in the received FH-MFSK signals during each chip period of the L-length sequence;

(b) decoding the received signals by adding the binary value of the Q frequencies determined as present in step (a) with a desired user's frequency-hopping address sequence during each chip period of the L-length sequence to generate a set of decoded signals forming a Q level by L-length detection matrix of received decoded message signals; and (c) determining which of the Q levels of the generated set of decoded signals have a maximum number of frequency presence indications over the L-length decoded sequence;

characterized in that the method comprises the further steps of:

(d) in response to a determination in step (c) that only one level has a maximum value, generating an output signal indicative of that level as the desired user's correct message;

(e) in response to a determination in step (c) that multiple levels have an equal maximum value, checking each maximum-length level element by seeing if an address sequence of one of the users other than the desired user could have produced detection matrix elements including the maximum-length level element being checked and generating a match signal if such address sequence could have caused the maximum-length level element;

(f) reiterating step (e) for each of the other user's address sequences and each of the elements of the determined multiple maximum-length levels;

(g) generating an output signal indicative of the maximum-length level having the least number of matches in performing steps (e) and (f); and (h) when multiple maximum-length levels are found having an equal minimal number of coincidences after performing steps (e) and (f), randomly choosing one of said equal maximum-length levels and generating an output signal indicative of said randomly chosen level.

* * * * *